April 7, 1953 C. C. JEFFRIES ET AL 2,633,676
WORK-SUPPORTING AND-GUIDING FIXTURE
Filed Aug. 28, 1950 2 SHEETS—SHEET 2
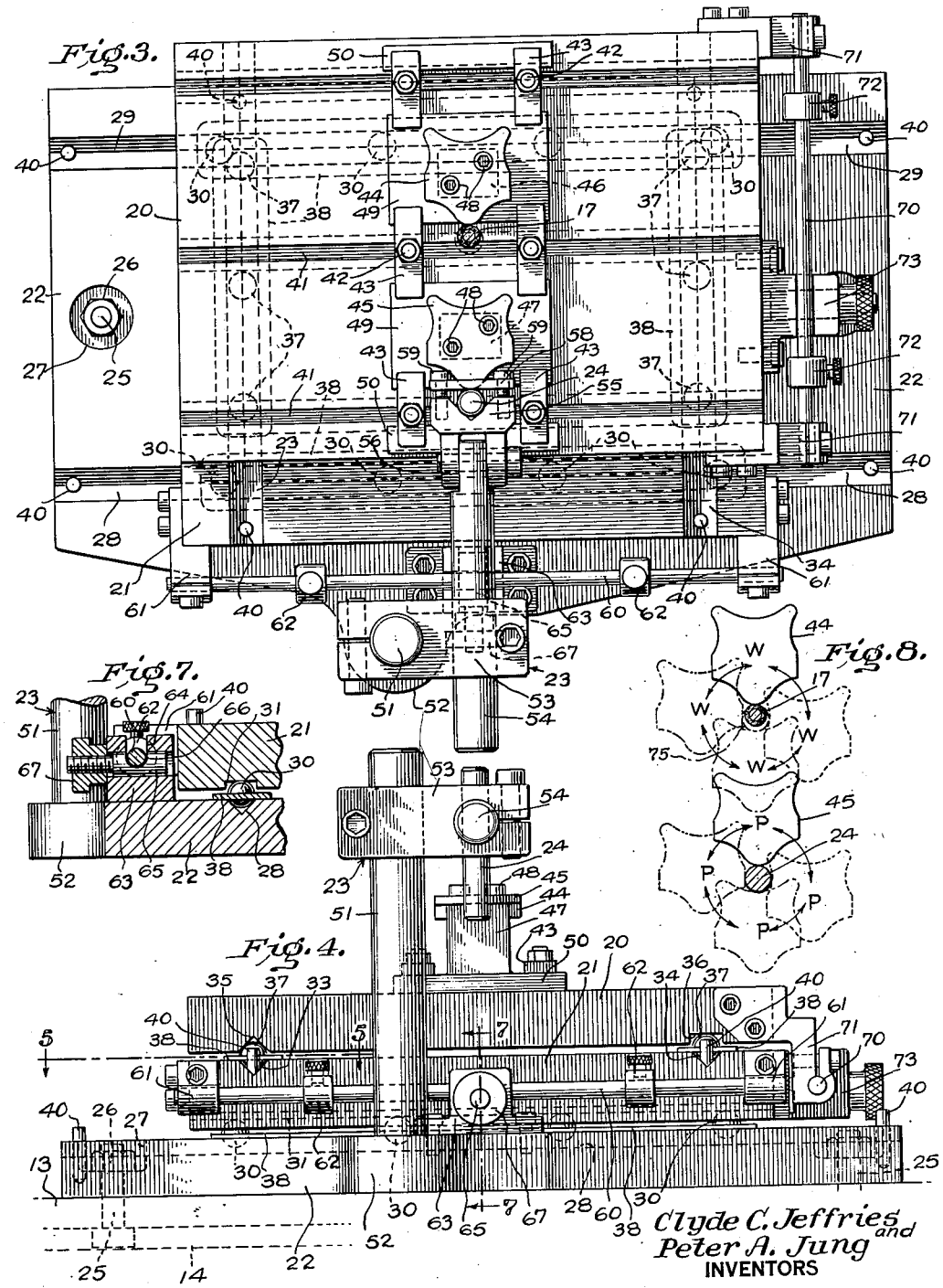
Clyde C. Jeffries and
Peter A. Jung
INVENTORS
BY Reginald W. Hoagland
ATTORNEY Patented Apr. 7, 1953

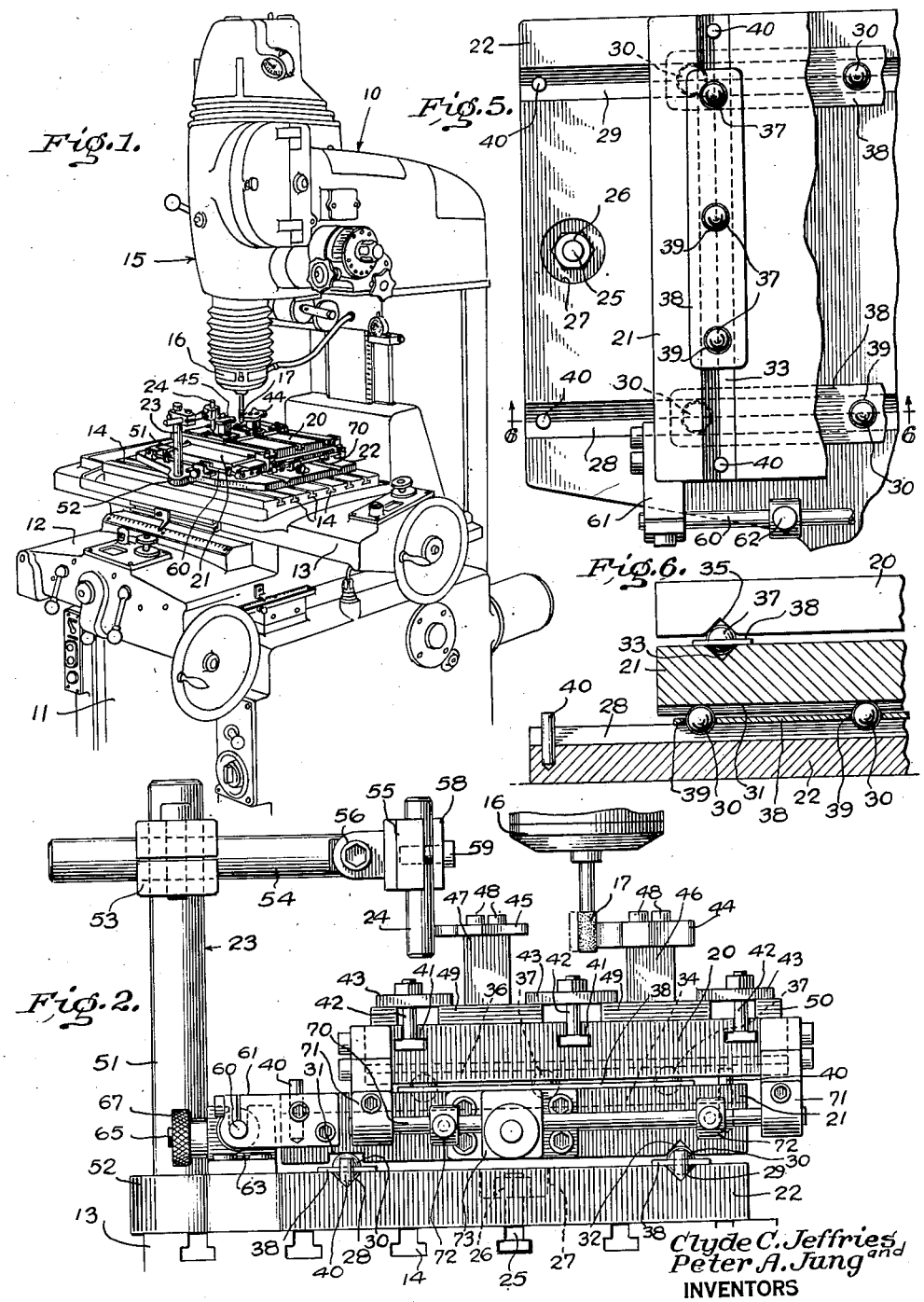

2,633,676

UNITED STATES PATENT OFFICE 2,633,676

WORK-SUPPORTING AND -GUIDING FIXTURE

Clyde C. Jeffries and Peter A. Jung, Flint, Mich.

Application August 28, 1950, Serial No. 181,858

6 Claims. (Cl. 51—100)

This invention relates to work-supporting and -guiding fixtures, and the principal object is to provide a novel and improved apparatus of this character for controlling the location of a workpiece relative to a tool or other object performing an operation thereon, said fixture being especially adapted for attachment to and use in conjunction with grinding machines of the type having vertical reciprocating and eccentrically adjustable high speed grind wheels for precision grinding work parts to identical contours as those of master parts or patterns.

Another object of the invention is to provide a fixture for use with a grinding machine of the above-indicated character, wherein a work part and a master part or pattern are attached in fixed relationship to one another on a slide freely mounted for finger tip movement in all directions on a horizontal plane for contacting the work with the grind wheel while traversing the contour of the master part or pattern along and around a stationary guide pin adjustably carried by the fixture, and thereby shape the work to the same contour as that of the master part or pattern.

Another object of the invention is to provide a grinding fixture in conformity with the above-mentioned objects, wherein the slide to which the work and master part or pattern are attached is freely movable and guided in one horizontal direction on spaced balls in parallel grooves in the underside of the slide and upper side of an intermediate plate, said intermediate plate being supported in a like manner on a base plate clamped to the table of the grinding machine, but movable in a direction at right angles to that of said first-mentioned movement. Said slide, intermediate plate, and base plate are of relatively heavy construction and are so freely mounted with respect to one another that the slide and intermediate plate while resting on the balls rely solely on their own weight and weight of parts thereon for proper horizontal support, thereby presenting a construction where they are separable from each other and the base plate by merely lifting one from another.

A further object of the invention is to provide a grinding fixture in accordance with the preceding objects for grinding machines of the type previously set forth wherein the guide pin of the fixture is of a diameter greater than the diameter of an imaginary circle scribed by the outermost travel of an adjusted position of the eccentric throw of the grind wheel for permitting a slightly oversize or rough grinding operation of the work and thereby not requiring an adjustment of the eccentric throw during this initial grinding to compensate for any change in diameter of the grind wheel caused by grinding wear or dressing of same before performing a final grinding operation to the work which requires that the eccentric throw of the grind wheel be adjusted in accordance with the diameter of the grind wheel at such time to scribe an imaginary circle with the outermost travel of the grind wheel equal in diameter to that of the diameter of the guide pin to grind the work part to the identical contour of the master part or pattern.

A further object of the invention is to provide a grinding fixture of the above-indicated character, wherein the balls upon which the slide and intermediate plate rest for finger tip horizontal movement are few in number and are spaced apart by being partially received in openings in thin plates freely slidable on the upper surfaces of the intermediate and base plates and limited against excessive sliding movement by fixed stops.

A still further object of the invention is to provide a fixture as outlined above with locking means and adjustable stops for controlling horizontal movement of the slide and intermediate plate in their directions of travel relative one another and the base plate, and for permitting ready separation of the slide, intermediate plate, and base plate from each other.

It is also an object of the invention to provide a grinding fixture as set forth in the preceding objects which is simple and substantial in construction, economical to manufacture, and thoroughly efficient and practical in use.

These, together with various auxiliary features and objects of the invention which will later become apparent as the following description proceeds, are attained by the present invention, a preferred embodiment of which has been illustrated, by way of example only, in the accompanying drawings, wherein:

Figure 1 is a fragmentary perspective view of a grinding machine, showing the improved fixture attached thereto;

Figure 2 is an end elevation of the grinding fixture;

Figure 3 is a plan view of the grinding fixture, showing a grind wheel of the grinding machine in cross section;

Figure 4 is a front elevation of the grinding fixture;

Figure 5 is a horizontal section on line 5—5 of Figure 4;

Figure 6 is a vertical section taken substantially on line 6—6 of Figure 5, with the slide in place;

Figure 7 is a vertical fragmentary section taken on line 7—7 of Figure 4; and

Figure 8 is a diagram illustrating the position of the work to the grind wheel while traversing the contour of the master part or pattern along and around the guide pin.

Referring now more specifically to the accompanying drawings, wherein like numerals designate similar parts throughout the various views, attention is directed first to Figure 1, wherein it will be seen that there is indicated at 10 a grinding machine of the type previously set forth, having a base 11 on which a cross slide 12 and table slide 13 with T grooves 14 therein are arranged, while located above the table and supported by the base is a grinding head 15 provided with a vertical power-driven reciprocating and eccentrically adjustable grind wheel spindle, not shown, on which a high speed air turbine 16 and arbor for the grind wheel 17 are supported.

The improved grinding fixture consists mainly of a work- and pattern-supporting slide 20 freely movable in one horizontal direction on an intermediate plate 21, which in turn is freely movable on a base plate 22 in a horizontal direction at right angles to the movement of the slide, and a support 23 for a guide pin 24 carried by the base plate 22 for adjustably supporting the guide pin in a position for controlling movement of the work relative to the grind wheel 17 of the grinder.

As illustrated, the slide 20, intermediate plate 21, and base plate 22 are all of heavy metallic construction, each being produced from a single piece of thick stock accurately formed and ground to perfect size and thickness which, when assembled, support the slide 20 and intermediate plate 21 on absolutely perfect horizontal planes during movement of said slide and intermediate plate. The base plate 22 is rigidly secured on the horizontal surface of the table slide 13 of the grinding machine by bolts 25 extending through holes in the base plate with the heads of said bolts received in the grooves 14 of the table 13 while nuts 26 threaded on said bolts are located below the upper surface of said plate in counterbores 27 at said holes.

Extending the full length of the base plate in the upper surface thereof and spaced a considerable distance apart is a pair of parallel V-shaped ways 28 and 29 in which balls 30 roll. Spaced the same distance apart and extending in the same direction as that of the ways 28 and 29, but in the under-surface of the intermediate plate 21, are other ways 31 and 32 in which the balls 30 also roll upon movement of the intermediate plate in a horizontal direction lengthwise of the base plate, the way 32 being V-shaped and similar to the ways 28 and 29 for guiding the direction of movement of the intermediate plate relative to the base plate, while the way 31 is provided with a flat ball-engaging surface to compensate for any irregularities should the spacing and aligning of the two sets of ways not be on dead centers.

A similar construction of support and guide for the slide 20 on and relative to the intermediate plate 21 is provided, but instead of being arranged for movement of the slide in a horizontal direction longitudinally of the base plate, is in a horizontal direction transversely thereof, there being V-shaped ways 33 and 34 in the upper surface of the intermediate plate 21, and a V-shaped way 35 and a flat surface way 36 in the under-surface of the slide 20 in which the balls 37 roll.

For holding the balls spaced from one another and for distributing a small number thereof over a large area, thin plates 38 provided with holes 39 in which the balls 30 and 37 are partially received slide over the top surfaces of the base plate and intermediate plate during horizontal movements of the intermediate plate and slide. These thin plates 38 are of greater width than the ways and are preferably constructed of brass or other soft metal to prevent marring of the surfaces of the intermediate and base plates at the ways. To limit the thin ball-holding plates 38 against excessive sliding movement whereby the balls would roll past the ends of the ways and drop therefrom, stop pins 40 are fixed at the ends of the ways 28, 29, 33, and 34 in the upper surfaces of the base and intermediate plates.

In the upper portion of the slide 20 and extending lengthwise of the base plate in spaced parallel relation to one another are inverted T grooves 41 into which the heads of bolts 42 of clamping bars 43 engage for attaching a workpiece 44 and a master part or pattern 45 on the upper surface of the slide 20. For purpose of illustration, the workpiece 44 and a pattern 45 are shown attached to the slide by securing same in elevated positions on the upper ends of pedestals 46 and 47, respectively, with screws 48, while the pedestals are attached to the slide by engaging the clamping bars 43 over base flanges 49 on said pedestals and over spacer bars 50. In cases where the workpieces and master parts are of constructions that permit direct attachment of the work and master part to the slide or lend themselves to other modes of attachment, the pedestals 46 and 47 obviously will not be used.

The adjustable support 23 for the guide pin 24 consists of a post 51 fixed at its lower end to a side extension 52 of the base plate 22, a clamp 53 slidably and rotatably mountable to various clamped positions on the post 51, an arm 54 slidable and rotatable in the clamp to various clamped positions extending laterally of the post, and a guide pin supporting head 55 pivoted, as at 56, on the arm 54 and adapted to be clamped in different adjusted pivoted positions relative to the arm. The head 55 is provided with a V-shaped groove 57 which is offset to a side of the center line of the pivotal connection 56 and which extends at right angles to said center line and into which the guide pin 24 is clamped in vertical adjusted positions by a flat plate 58 and bolts 59.

While stops 40 are provided to limit sliding movement of the ball-spacing plates 38 and thereby retard finger tip movement of the slide 20, such stops will not prevent the slide 20 and intermediate plate 21 from being moved to positions where they may overbalance from their perfect horizontal positions; therefore, an adjustable positive stop construction is provided for both the slide and intermediate plate which also incorporates locking features for the slide and intermediate plate to hold either or both against movement while the work 44 and master part or pattern 45 are being adjusted relative to one another and relative to the grind wheel 17 and guide pin 24, respectively, during attachment of the parts to the slide. The adjustable stops and lock for horizontal movement of the intermediate plate 21 relative to the base plate 22 consist of rigidly mounting a rod 60 along one side of the intermediate plate 21 by securing the ends thereof in brackets 61 attached to corners of the plate 21, and adjustably mounting two collars 62 on said rod at opposite sides of a central stop bracket 63 attached to the base plate substantially midway of its length; the rod 60 extends through the central bracket 63 and may be clamped to said bracket to hold the intermediate plate against movement. By referring to Figure 7 which illustrates the construction of the locking feature, it can be seen that the stop bracket 63 is forked at its upper portion, as at 64, for permitting the rod to be raised therefrom when separating the intermediate plate 21 from the base plate 22, and that a pin 65 with a notch 66 therein through which the rod also extends is slidably mounted at right angles to the rod in an opening in the bracket 63. Said pin 65 is moved endwise by a thumb nut 67 threaded on an end of the pin and engages the bracket to bind the rod 60 between walls of the forked portion 64 of the bracket and notch 66 of the pin.

The adjustable stop and lock for controlling movement of the slide 20 with respect to the intermediate plate 21 are identical in operation and substantially the same in construction, there being slight differences in dimensions and construction of certain parts to suit conditions. In this construction, the rod 70 is of shorter length and is supported by depending brackets 71 on the slide 20 in a position where said rod extends along one side of the intermediate plate 21, and the pair of adjustable collars 72 on the rod 70 engages opposite sides of a forked stop bracket 73 attached to a side edge of the intermediate plate 21.

In operation, the work 44 and master part or pattern 45 are attached to the slide 20 in spaced-apart positions and preferably square and parallel to each other using finished surfaces, accurately drilled holes, or dowel pins for locations of said work and pattern with respect to one another. The cross slide 12 and table slide 13 of the grinding machine are then adjusted to position the work 44 relative to the grind wheel 17 to determine if the required movement of the work is within the limits of horizontal movement of the slide. The guide pin 24 is then adjusted square and parallel to the center line of the grind wheel and to a position with centers of both grind wheel and guide pin equal distances from measuring points on the work and master part or pattern. Such measurements for correct position of parts can be checked by locking the slide 20 and intermediate plate 21 against movement on the base plate 22 and moving the cross slide 12 and table slide 13 of the grinding machine according to scale and vernier readings on the grinding machine to locate measuring points on the master part or pattern relative to the grind wheel and then comparing the distances of movement of the cross slide and table slide with size of work and/or pattern and micrometer measurements made between the work and pattern or including either or both the work and pattern.

As previously stated, the diameter of the guide pin, while having a radius less than any radius or inwardly curved surface which it must follow on the master part or pattern, is of greater diameter than the diameter of an imaginary circle scribed by the outermost travel of an adjusted position of the eccentric throw of the grind wheel, and it is to such adjustment that the eccentric throw is set when starting a grinding operation.

With the slide 20 free for horizontal movement in all directions, the slightest pressure of the hands of the operator against the slide in proper directions will engage the surfaces of the work to be ground against the grind wheel. The grinding is continued in this manner until the guide pin 24 engages the master part or pattern along entire surfaces corresponding to those ground on the workpiece, which leaves the ground surfaces of the work slightly full due to the eccentric throw of the grind wheel being less than that required to grind on a circle of equal diameter to the diameter of the guide pin. By then increasing the eccentric throw of the grind wheel to grind on a circle of the same diameter as the guide pin and again gently passing the grind wheel back and forth on the surface to be ground until sparking ceases, the ground surface of the work will be identical to that of the master part or pattern.

By having the slide so freely mounted that the operator uses only his finger tips to move same to engage the grind wheel with the work and the master part or pattern with the guide pin, neither the guide pin nor the grind wheel will be sprung off dead center upon contact with their respective parts, which would cause inaccurate grinding of the work.

Figure 8 illustrates diagrammatically a pattern 45 and a workpiece 44 of the same contour as that shown in Figure 3 and of a shape requiring that the pattern and work be moved entirely around the guide pin 24 and grind wheel 17, respectively, for grinding the work to identical shape as that of the pattern. The pattern marked P and the work marked W are shown in corresponding manners in like positions with respect to the members they encircle and are of different illustrations substantially every ninety degrees of their travel. The dash and dot circle eccentric to the diameter of the grind wheel 17 and designated by the numeral 75 is of the same diameter as that of the guide pin 24 and indicates the outermost travel of an adjusted position of the eccentric throw of the grind wheel when performing a final grinding operation.

While the improved fixture is especially designed for use with grinding machines of the type indicated, it can be conveniently and efficiently used independent of a grinding machine for other purposes such as inspection work when checking parts for correct size and location of openings therein with or without the use of Johansson gauge blocks or other suitable measuring instruments.

In view of the foregoing description taken in conjunction with the accompanying drawings, it is believed that a clear understanding of the construction, operation, and advantages of the device will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. A work-supporting and -guiding fixture in combination with a grinding machine having an eccentrically adjustable high speed grind wheel rotatable about a vertical axis and having a horizontally adjustable table, comprising a base plate adapted to be attached to said table, an intermediate plate freely movable horizontally in one direction on said base plate, a slide freely movable horizontally on said intermediate plate in a direction at right angles to said first-mentioned movement, means for adjustably attaching a workpiece and a pattern on said slide, a vertical post rigidly supported by said base plate, a clamp slidably and rotatably mountable to various clamped positions on said post, an arm slidable and rotatable in said clamp to various clamped positions extending laterally of the post, a head pivotally connected to said arm and adapted to be clamped in different adjusted pivoted positions relative to the arm, and a circular guide pin vertically adjustable in said head and along which the pattern is horizontally moved while the grind wheel of the grinding machine engages the workpiece.

2. A work-supporting and -guiding fixture comprising a horizontally arranged base plate, an intermediate plate freely movable horizontally in one direction on said base plate, a slide freely movable horizontally on said intermediate plate in a direction at right angles to said first-mentioned movement, means for adjustably attaching a workpiece and a pattern on said slide, a vertical post rigidly supported by said base plate, a clamp slidably and rotatably mountable to various clamped positions on said post, an arm slidable and rotatable in said clamp to various clamped positions extending laterally of the post, a head pivotally connected to said arm and adapted to be clamped in different adjusted pivoted positions relative to the arm, and a circular guide pin vertically adjustable in said head and along which the pattern is horizontally moved while the grind wheel of the grinding machine engages the workpiece.

3. A work-supporting and -guiding fixture comprising a horizontally arranged base plate, an intermediate plate freely movable horizontally in one direction on said base plate, a slide freely movable horizontally on said intermediate plate in a direction at right angles to said first-mentioned movement, rods rigidly carried at their ends by said slide and intermediate plate, forked brackets fixed to said intermediate and base plates through which the rods slidably extend, the rod carried by the slide extending through the forked bracket fixed to the intermediate plate while the rod carried by the intermediate plate extends through the forked bracket fixed to the base plate, adjustable stops on said rods engageable with said forked brackets to limit horizontal movements of the slide and intermediate plates, means for adjustably attaching a workpiece and a pattern on said slide, and a circular guide pin adjustably supported from said base plate along which the pattern is horizontally moved to guide an operation being performed on the workpiece.

4. A work-supporting and -guiding fixture comprising a horizontally arranged base plate, an intermediate plate freely movable horizontally in one direction on said base plate, a slide freely movable horizontally on said intermediate plate in a direction at right angles to said first-mentioned movement, rods rigidly carried at their ends by said slide and intermediate plate, forked brackets fixed to said intermediate and base plates through which the rods slidably extend, the rod carried by the slide extending through the forked bracket fixed to the intermediate plate while the rod carried by the intermediate plate extends through the forked bracket fixed to the base plate, clamping elements on said forked brackets adapted to engage said rods to hold the slide and intermediate plate against horizontal movement, means for adjustably attaching a workpiece and a pattern on said slide, and a circular guide pin adjustably supported from said base plate along which the pattern is horizontally moved to guide an operation being performed on the workpiece.

5. A work-supporting and -guiding fixture in combination with a grinding machine having an eccentrically adjustable high speed grind wheel rotatable about a vertical axis for grinding horizontally and having a horizontally adjustable table, comprising a base adapted to be attached to said table, a slide supported by and above said base and being freely movable in all horizontal directions relative to said base while maintaining square and parallel relationship with said base, means for attachment of a workpiece and a pattern side by side on said slide, and a circular guide pin parallel with the axis of said grind wheel along the circular side surface of which vertical edges of the pattern are moved by finger tip pressure applied to the freely movable slide while the circular grinding surface of the grinding wheel engages vertical surfaces of the workpiece, said circular guide pin being of a greater diameter than the diameter of the grinding wheel and of a diameter no greater than the greatest adjustable diameter of the outermost circular path of movement of the grinding surface of the grinding wheel produced by the eccentric throw of the grinding machine.

6. In a work-supporting and -guiding fixture attachment for a grinding machine having an eccentrically adjustable high speed grind wheel rotatable about a vertical axis for grinding horizontally and having a horizontally adjustable table; the combination of a base adapted to be attached to said table, a slide supported by and above said base and being freely movable in all horizontal directions relative to said base while maintaining square and parallel relationship with said base, means for attachment of a workpiece and a pattern side by side on said slide, and a depending circular guide pin adjustably supported from said base plate and adapted to be positioned parallel with the vertical axis of said grind wheel so as to have vertical edges of the pattern moved horizontally along the circular side surface thereof while the circular grinding surface of the grinding wheel engages vertical surfaces of the workpiece, said circular guide pin being of a greater diameter than the diameter of the grind wheel and of a diameter less than the greatest adjustable diameter of the outermost circular path of movement of the grinding surface of the grinding wheel produced by the eccentric throw of the grinding machine.

CLYDE C. JEFFRIES.
PETER A. JUNG.

REFERENCES CITED

The following references are of record in the file of this patent:

UNITED STATES PATENTS

| Number | Name | Date |
| --- | --- | --- |
| 1,395,145 | Robbins | Oct. 25, 1921 |
| 1,440,184 | Stenger | Dec. 26, 1922 |
| 1,522,109 | Fiddyment | Jan. 6, 1925 |
| 1,674,673 | Williams | June 26, 1928 |
| 2,005,696 | Gorton | June 18, 1935 |
| 2,141,751 | Hertlein | Dec. 27, 1938 |
| 2,386,283 | Wiken et al. | Oct. 9, 1945 |

FOREIGN PATENTS

| Number | Country | Date |
| --- | --- | --- |
| 10,124 | Great Britain | May 15, 1905 |